United States Patent
Kaita

(10) Patent No.: US 8,215,424 B2
(45) Date of Patent: Jul. 10, 2012

(54) POWER OUTPUT APPARATUS, MOTOR VEHICLE EQUIPPED WITH POWER OUTPUT APPARATUS, AND CONTROL METHOD OF POWER OUTPUT APPARATUS

(75) Inventor: Keiji Kaita, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 263 days.

(21) Appl. No.: 11/795,031

(22) PCT Filed: Aug. 24, 2006

(86) PCT No.: PCT/JP2006/317149
§ 371 (c)(1),
(2), (4) Date: Jul. 11, 2007

(87) PCT Pub. No.: WO2007/024013
PCT Pub. Date: Mar. 1, 2007

(65) Prior Publication Data
US 2008/0110684 A1 May 15, 2008

(30) Foreign Application Priority Data
Aug. 25, 2005 (JP) ................................. 2005-244261

(51) Int. Cl.
*B60W 10/06* (2006.01)
(52) U.S. Cl. ................ 180/65.265; 180/65.26; 701/86; 701/103; 60/300
(58) Field of Classification Search ............... 180/65.25, 180/65.26; 701/86, 103, 104, 105, 106, 107; 60/300
See application file for complete search history.

(56) References Cited

U.S. PATENT DOCUMENTS

| | | | |
|---|---|---|---|
| 5,614,809 A | | 3/1997 | Kiuchi et al. |
| 6,018,694 A | * | 1/2000 | Egami et al. .................. 701/102 |
| 6,202,782 B1 | * | 3/2001 | Hatanaka ....................... 180/301 |
| 6,470,985 B1 | * | 10/2002 | Inada et al. ................ 180/65.245 |
| 6,566,826 B2 | * | 5/2003 | Imai et al. ........................ 318/11 |
| 6,687,580 B2 | * | 2/2004 | Suzuki et al. .................... 701/22 |
| 6,785,603 B2 | * | 8/2004 | Inoue ............................ 701/112 |
| 6,792,750 B2 | * | 9/2004 | Nagai et al. ..................... 60/285 |
| 6,991,052 B2 | * | 1/2006 | Nogi et al. ................ 180/65.235 |
| 7,007,464 B1 | * | 3/2006 | Asami et al. ................... 60/300 |
| 7,028,793 B2 | * | 4/2006 | Hu et al. ................... 180/65.25 |

(Continued)

FOREIGN PATENT DOCUMENTS

EP 1 065 362 A1 1/2001

(Continued)

*Primary Examiner* — Jeffrey J Restifo
*Assistant Examiner* — Erez Gurari
(74) *Attorney, Agent, or Firm* — Oliff & Berridge, PLC

(57) ABSTRACT

In requirement of catalyst degradation control with setting of a catalyst degradation control flag Fc to 1, the braking control of the invention sets torque commands Tm1* and Tm2* of two motors and controls the operations of an engine and the two motors to shift a drive point of the engine on an optimum fuel consumption operation curve by a preset rotation speed variation Nrt1 in a specific range of rotation speed that ensures no occurrence of a misfire in the engine within an input limit Win of a battery and to ensure output of a braking torque demand Tr* to a ring gear shaft or driveshaft (steps S200 to S250). Such braking control stably lowers a rotation speed Ne of the engine to a target rotation speed Ne* and desirably enhances the fuel consumption under the catalyst degradation control.

17 Claims, 7 Drawing Sheets

U.S. PATENT DOCUMENTS

| | | | |
|---|---|---|---|
| 7,058,487 B2 * | 6/2006 | Hara et al. | 701/22 |
| 7,059,116 B2 * | 6/2006 | Kusada et al. | 60/285 |
| 2004/0236483 A1 * | 11/2004 | Kimura | 701/22 |
| 2005/0115227 A1 * | 6/2005 | Surnilla et al. | 60/295 |
| 2005/0229890 A1 * | 10/2005 | Ichimoto et al. | 123/179.4 |
| 2006/0032479 A1 * | 2/2006 | Megli et al. | 123/322 |
| 2006/0173604 A1 * | 8/2006 | Yasui et al. | 701/103 |
| 2006/0241847 A1 * | 10/2006 | Kolmanovsky et al. | 701/103 |
| 2008/0110684 A1 * | 5/2008 | Kaita | 180/65.2 |

FOREIGN PATENT DOCUMENTS

| | | |
|---|---|---|
| JP | A 2003-207043 | 7/2003 |
| JP | A 2004-176710 | 6/2004 |
| JP | A 2004-324424 | 11/2004 |
| JP | A 2004-340102 | 12/2004 |
| JP | A 2007-55573 | 3/2007 |

* cited by examiner

POWER OUTPUT APPARATUS, MOTOR VEHICLE EQUIPPED WITH POWER OUTPUT APPARATUS, AND CONTROL METHOD OF POWER OUTPUT APPARATUS

TECHNICAL FIELD

The present invention relates to a power output apparatus, a motor vehicle equipped with the power output apparatus, and a control method of the power output apparatus.

BACKGROUND ART

One proposed power output apparatus mounted on a vehicle includes an internal combustion engine, a planetary gear having a carrier and a ring gear respectively linked with an output shaft of the internal combustion engine and with an axle of the vehicle, a first motor outputting power to a sun gear of the planetary gear, and a second motor outputting power to the ring gear of the planetary gear (see, for example, Japanese Patent Laid-Open Gazette No. 2004-324424). The vehicle is further equipped with a catalytic conversion unit that uses a catalyst for catalytic conversion of an exhaust gas or emission from the internal combustion engine. In response to a deceleration request of the vehicle under the condition of a catalyst temperature of or over a preset reference level, this prior art power output apparatus prohibits fuel cutoff to the internal combustion engine to prevent deterioration of the catalyst. The power output apparatus continues explosive combustion of a fuel in the internal combustion engine, while controlling the first motor to generate electric power and lowering the rotation speed of the internal combustion engine. For continuation of the explosive combustion, a preset quantity of fuel, which slightly exceeds a minimum level ensuring no occurrence of a misfire, is to be continuously supplied to the internal combustion engine.

DISCLOSURE OF THE INVENTION

In the course of decreasing the rotation speed of the internal combustion engine, this prior art power output apparatus prohibits the fuel cutoff to the internal combustion engine and continuously supplies the preset amount of fuel, which is slightly over the minimum level ensuring no occurrence of a misfire, to the internal combustion engine to enable continuous explosive combustion of the fuel in the internal combustion engine. Even a subtle change in operating status of the internal combustion engine or in a driving status of the first motor may, however, cause a misfire in the internal combustion engine. The accurate and precise control is accordingly required to effectively prevent a misfire in the internal combustion engine.

In the power output apparatus of the invention, the motor vehicle equipped with the power output apparatus, and the control method of the power output apparatus, the object of the invention is to keep explosive combustion of a fuel in the internal combustion engine and stably lower the rotation speed of the internal combustion engine in response to demand of a braking force or a light load under requirement of the continuous explosive combustion. In the power output apparatus of the invention, the motor vehicle equipped with the power output apparatus, and the control method of the power output apparatus, the object of the invention is also to enhance the fuel consumption in the course of decreasing the rotation speed of the internal combustion engine in response to demand of a braking force or a light load under requirement of continuous explosive combustion of the fuel in the internal combustion engine.

In order to attain at least part of the above and the other related objects, the power output apparatus of the invention, the motor vehicle equipped with the power output apparatus, and the control method of the power output apparatus have the configurations discussed below.

The present invention is directed to a power output apparatus that outputs power to a driveshaft, said power output apparatus includes: an internal combustion engine that has an output shaft and outputs power; an electric power-mechanical power input output mechanism that is connected with the output shaft of the internal combustion engine and with the driveshaft and outputs at least part of the output power of the internal combustion engine to the driveshaft through input and output of electric power and mechanical power; a motor that inputs and outputs power from and to the driveshaft; an accumulator unit that transmits electric power to and from both the electric power-mechanical power input output mechanism and the motor; a driving force demand setting unit that sets a driving force demand to be output to the driveshaft; a target operation state setting module that, upon no satisfaction of an explosive combustion continuation condition for keeping explosive combustion of a fuel in the internal combustion engine, enables intermittent operation of the internal combustion engine and sets a target operation state of the internal combustion engine based on the set driving force demand, while upon satisfaction of the explosive combustion continuation condition, continuously keeping operation of the internal combustion engine and setting the target operation state of the internal combustion engine based on the set driving force demand; and a control module that, in a state other than a specific driving state of outputting either a braking force or a light load to the driveshaft under the explosive combustion continuation condition, controls the internal combustion engine, the electric power-mechanical power input output mechanism, and the motor to drive the internal combustion engine in the set target operation state and to ensure output of a driving force equivalent to the set driving force demand to the driveshaft, while in the specific driving state under the explosive combustion continuation condition, controlling the internal combustion engine, the electric power-mechanical power input output mechanism, and the motor to make an operating status of the internal combustion engine approach to the set target operation state via a route under a predetermined restriction with continuation of the explosive combustion of the fuel in the internal combustion engine and to ensure output of the driving force equivalent to the set driving force demand to the driveshaft.

Upon no satisfaction of the explosive combustion continuation condition for keeping explosive combustion of the fuel in the internal combustion engine, the power output apparatus of the invention enables intermittent operation of the internal combustion engine and sets the target operation state of the internal combustion engine based on the set driving force demand required for the driveshaft. Upon satisfaction of the explosive combustion continuation condition, on the other hand, the power output apparatus continuously keeps operation of the internal combustion engine and sets the target operation state of the internal combustion engine based on the set driving force demand. In the state other than the specific driving state of outputting either the braking force or the light load to the driveshaft under the explosive combustion continuation condition, the power output apparatus of the invention controls the internal combustion engine, the electric power-mechanical power input output mechanism, and the motor to drive the internal combustion engine in the set target operation state and to ensure output of the driving force equivalent to the set driving force demand to the driveshaft. In the specific driving state under the explosive combustion continuation condition, the power output apparatus controls the internal combustion engine, the electric power-mechanical power input output mechanism, and the motor to make the operating status of the internal combustion engine approach to the set target operation state via the route under the predetermined restriction with continuation of the explosive combustion of the fuel in the internal combustion engine and to ensure output of the driving force equivalent to the set driving force demand to the driveshaft. In the specific driving state, the operating status of the internal combustion engine thus approaches to the target operation state via the route under the predetermined restriction. This arrangement ensures a more stable approach of the operating status of the internal combustion engine to the target operation state, compared with the conventional structure of continuously supplying the preset quantity of fuel, which slightly exceeds the minimum level ensuring no occurrence of a misfire, to the internal combustion engine. A relatively low rotation speed is set to the target operation state on the occasion of demand of a braking force or a light load. In the specific driving state, the power output apparatus of the invention thus stably lowers the rotation speed of the internal combustion engine, while keeping the explosive combustion of the fuel in the internal combustion engine. The predetermined restriction may be a constraint for efficient operation of the internal combustion engine. This desirably enhances the fuel consumption in the course of an approach of the operating status of the internal combustion engine to the target operation state.

In one preferable embodiment of the invention, the power output apparatus further includes a chargeable range detection unit that detects a chargeable range of the accumulator unit. The control module controls the internal combustion engine, the electric power-mechanical power input output mechanism, and the motor to make the operating status of the internal combustion engine approach to the set target operation state via the route under the predetermined restriction with continuation of the explosive combustion of the fuel in the internal combustion engine within the detected chargeable range of the accumulator unit. This arrangement effectively prevents overcharge of the accumulator unit.

In one preferable application of the power output apparatus of the invention, the control module controls the internal combustion engine, the electric power-mechanical power input output mechanism, and the motor to change a rotation speed of the internal combustion engine by a specified rotation number per unit time and thereby make the operating status of the internal combustion engine approach to the set target operation state. The operating status of the internal combustion engine can thus be changed by the specified rotation number per unit time. This arrangement desirably prevents a misfire and other potential troubles arising in the internal combustion engine due to an abrupt decrease in rotation speed of the internal combustion engine. It is preferable to make the specified rotation number per unit time smaller than a rotation number per unit time under control in the state other than the specific driving state to make the operating status of the internal combustion engine approach to the set target operation state. This effectively prevents a misfire of the internal combustion engine.

In another preferable application of the power output apparatus of the invention, the internal combustion engine is equipped with a catalytic conversion unit that uses a catalyst for catalytic conversion of an exhaust gas or emission from the internal combustion engine. The explosive combustion continuation condition executes catalyst degradation control to reduce degradation of the catalyst used by the catalytic conversion unit. This arrangement effectively prevents deterioration of the catalyst used in the catalytic conversion unit.

In one preferable application of the power output apparatus of the invention, wherein the electric power-mechanical power input output mechanism includes: a three shaft-type power input output structure that is connected to three shafts, the output shaft of the internal combustion engine, the driveshaft, and a rotating shaft, and inputs and outputs power from and to a residual shaft based on powers input and output from and to any two shafts among the three shafts; and a generator that inputs and outputs power from and to the rotating shaft.

The present invention is directed to a motor vehicle including: an internal combustion engine that has an output shaft and outputs power; an electric power-mechanical power input output mechanism that is connected with the output shaft of the internal combustion engine and with the first axle and outputs at least part of the output power of the internal combustion engine to the driveshaft through input and output of electric power and mechanical power; a motor that inputs and outputs power from and to the first axle or a second axle different from said first axle; an accumulator unit that transmits electric power to and from both the electric power-mechanical power input output mechanism and the motor; a driving force demand setting unit that sets a driving force demand required for a drive of said vehicle; a target operation state setting module that, upon no satisfaction of an explosive combustion continuation condition for keeping explosive combustion of a fuel in the internal combustion engine, enables intermittent operation of the internal combustion engine and sets a target operation state of the internal combustion engine based on the set driving force demand, while upon satisfaction of the explosive combustion continuation condition, continuously keeping operation of the internal combustion engine and setting the target operation state of the internal combustion engine based on the set driving force demand; and a control module that, in a state other than a specific driving state of outputting either a braking force or a light load to the vehicle under the explosive combustion continuation condition, controls the internal combustion engine, the electric power-mechanical power input output mechanism, and the motor to drive the internal combustion engine in the set target operation state and to ensure output of a driving force equivalent to the set driving force demand to the vehicle, while in the specific driving state under the explosive combustion continuation condition, controlling the internal combustion engine, the electric power-mechanical power input output mechanism, and the motor to make an operating status of the internal combustion engine approach to the set target operation state via a route under a predetermined restriction with continuation of the explosive combustion of the fuel in the internal combustion engine and to ensure output of the driving force equivalent to the set driving force demand to the vehicle.

Upon no satisfaction of the explosive combustion continuation condition for keeping explosive combustion of the fuel in the internal combustion engine, the motor vehicle of the invention enables intermittent operation of the internal combustion engine and sets the target operation state of the internal combustion engine based on the set driving force demand required for a drive of said vehicle. Upon satisfaction of the explosive combustion continuation condition, on the other hand, the motor vehicle continuously keeps operation of the internal combustion engine and sets the target operation state of the internal combustion engine based on the set driving force demand. In the state other than the specific driving state of outputting either the braking force or the light load to the vehicle under the explosive combustion continuation condition, the motor vehicle of the invention controls the internal combustion engine, the electric power-mechanical power input output mechanism, and the motor to drive the internal combustion engine in the set target operation state and to ensure output of the driving force equivalent to the set driving force demand to the vehicle. In the specific driving state under the explosive combustion continuation condition, the power output apparatus controls the internal combustion engine, the electric power-mechanical power input output mechanism, and the motor to make the operating status of the internal combustion engine approach to the set target operation state via the route under the predetermined restriction with continuation of the explosive combustion of the fuel in the internal combustion engine and to ensure output of the driving force equivalent to the set driving force demand to the vehicle. In the specific driving state, the operating status of the internal combustion engine thus approaches to the target operation state via the route under the predetermined restriction. This arrangement ensures a more stable approach of the operating status of the internal combustion engine to the target operation state, compared with the conventional structure of continuously supplying the preset quantity of fuel, which slightly exceeds the minimum level ensuring no occurrence of a misfire, to the internal combustion engine. A relatively low rotation speed is set to the target operation state on the occasion of demand of a braking force or a light load. In the specific driving state, the power output apparatus of the invention thus stably lowers the rotation speed of the internal combustion engine, while keeping the explosive combustion of the fuel in the internal combustion engine. The predetermined restriction may be a constraint for efficient operation of the internal combustion engine. This desirably enhances the fuel consumption in the course of an approach of the operating status of the internal combustion engine to the target operation state.

In one preferable embodiment of the invention, the motor vehicle further includes a chargeable range detection unit that detects a chargeable range of the accumulator unit. The control module controls the internal combustion engine, the electric power-mechanical power input output mechanism, and the motor to make the operating status of the internal combustion engine approach to the set target operation state via the route under the predetermined restriction with continuation of the explosive combustion of the fuel in the internal combustion engine within the detected chargeable range of the accumulator unit. This arrangement effectively prevents overcharge of the accumulator unit.

In one preferable application of the motor vehicle of the invention, the control module controls the internal combustion engine, the electric power-mechanical power input output mechanism, and the motor to change a rotation speed of the internal combustion engine by a specified rotation number per unit time and thereby make the operating status of the internal combustion engine approach to the set target operation state. The operating status of the internal combustion engine can thus be changed by the specified rotation number per unit time. This arrangement desirably prevents a misfire and other potential troubles arising in the internal combustion engine due to an abrupt decrease in rotation speed of the internal combustion engine. It is preferable to make the specified rotation number per unit time smaller than a rotation number per unit time under control in the state other than the specific driving state to make the operating status of the internal combustion engine approach to the set target operation state. This effectively prevents a misfire of the internal combustion engine.

In another preferable application of the motor vehicle of the invention, the internal combustion engine is equipped with a catalytic conversion unit that uses a catalyst for catalytic conversion of an exhaust gas or emission from the internal combustion engine. The explosive combustion continuation condition executes catalyst degradation control to reduce degradation of the catalyst used by the catalytic conversion unit. This arrangement effectively prevents deterioration of the catalyst used in the catalytic conversion unit.

In one preferable application of the motor vehicle of the invention, wherein the electric power-mechanical power input output mechanism includes: a three shaft-type power input output structure that is connected to three shafts, the output shaft of the internal combustion engine, the driveshaft, and a rotating shaft, and inputs and outputs power from and to a residual shaft based on powers input and output from and to any two shafts among the three shafts; and a generator that inputs and outputs power from and to the rotating shaft.

The present invention is directed to a control method of the power output apparatus, said power output apparatus includes: an internal combustion engine that has an output shaft and outputs power; an electric power-mechanical power input output mechanism that is connected with the output shaft of the internal combustion engine and with the driveshaft and outputs at least part of the output power of the internal combustion engine to the driveshaft through input and output of electric power and mechanical power; a motor that inputs and outputs power from and to the driveshaft; an accumulator unit that transmits electric power to and from both the electric power-mechanical power input output mechanism and the motor; said control method of the power output apparatus includes the steps of (a) upon no satisfaction of an explosive combustion continuation condition for keeping explosive combustion of a fuel in the internal combustion engine, enables intermittent operation of the internal combustion engine and sets a target operation state of the internal combustion engine based on the driving force demand to be output to the driveshaft, while upon satisfaction of the explosive combustion continuation condition, continuously keeping operation of the internal combustion engine and setting the target operation state of the internal combustion engine based on the said driving force demand; and (b) in a state other than a specific driving state of outputting either a braking force or a light load to the driveshaft under the explosive combustion continuation condition, controls the internal combustion engine, the electric power-mechanical power input output mechanism, and the motor to drive the internal combustion engine in the set target operation state and to ensure output of a driving force equivalent to the said driving force demand to the driveshaft, while in the specific driving state under the explosive combustion continuation condition, controlling the internal combustion engine, the electric power-mechanical power input output mechanism, and the motor to make an operating status of the internal combustion engine approach to the set target operation state via a route under a predetermined restriction with continuation of the explosive combustion of the fuel in the internal combustion engine and to ensure output of the driving force equivalent to the said driving force demand to the driveshaft.

Upon no satisfaction of the explosive combustion continuation condition for keeping explosive combustion of the fuel in the internal combustion engine, the control method of the power output apparatus of the invention enables intermittent operation of the internal combustion engine and sets the target operation state of the internal combustion engine based on the set driving force demand required for the driveshaft. Upon satisfaction of the explosive combustion continuation condition, on the other hand, the control method of the power output apparatus continuously keeps operation of the internal combustion engine and sets the target operation state of the internal combustion engine based on the set driving force demand. In the state other than the specific driving state of outputting either the braking force or the light load to the driveshaft under the explosive combustion continuation condition, the control method of the power output apparatus of the invention controls the internal combustion engine, the electric power-mechanical power input output mechanism, and the motor to drive the internal combustion engine in the set target operation state and to ensure output of the driving force equivalent to the set driving force demand to the driveshaft. In the specific driving state under the explosive combustion continuation condition, the control method of the power output apparatus controls the internal combustion engine, the electric power-mechanical power input output mechanism, and the motor to make the operating status of the internal combustion engine approach to the set target operation state via the route under the predetermined restriction with continuation of the explosive combustion of the fuel in the internal combustion engine and to ensure output of the driving force equivalent to the set driving force demand to the driveshaft. In the specific driving state, the operating status of the internal combustion engine thus approaches to the target operation state via the route under the predetermined restriction. This arrangement ensures a more stable approach of the operating status of the internal combustion engine to the target operation state, compared with the conventional structure of continuously supplying the preset quantity of fuel, which slightly exceeds the minimum level ensuring no occurrence of a misfire, to the internal combustion engine. A relatively low rotation speed is set to the target operation state on the occasion of demand of a braking force or a light load. In the specific driving state, the control method of the power output apparatus of the invention thus stably lowers the rotation speed of the internal combustion engine, while keeping the explosive combustion of the fuel in the internal combustion engine. The predetermined restriction may be a constraint for efficient operation of the internal combustion engine. This desirably enhances the fuel consumption in the course of an approach of the operating status of the internal combustion engine to the target operation state.

In one preferable embodiment of the control method of the power output apparatus of the invention, said step (b) controls the internal combustion engine, the electric power-mechanical power input output mechanism, and the motor to make the operating status of the internal combustion engine approach to the set target operation state via the route under the predetermined restriction with continuation of the explosive combustion of the fuel in the internal combustion engine within the detected chargeable range of the accumulator unit. This arrangement effectively prevents overcharge of the accumulator unit.

In one preferable application of the control method of the power output apparatus of the invention, said step (b) controls the internal combustion engine, the electric power-mechanical power input output mechanism, and the motor to change a rotation speed of the internal combustion engine by a specified rotation number per unit time and thereby make the operating status of the internal combustion engine approach to the set target operation state. The operating status of the internal combustion engine can thus be changed by the specified rotation number per unit time. This arrangement desirably prevents a misfire and other potential troubles arising in the internal combustion engine due to an abrupt decrease in rotation speed of the internal combustion engine. It is preferable to make the specified rotation number per unit time smaller than a rotation number per unit time under control in the state other than the specific driving state to make the operating status of the internal combustion engine approach to the set target operation state. This effectively prevents a misfire of the internal combustion engine.

In another preferable application of the control method of the power output apparatus of the invention, the explosive combustion continuation condition may execute catalyst degradation control to reduce degradation of a catalyst used by a catalytic conversion unit, which is connected with the internal combustion engine and performs catalytic conversion of an exhaust gas or emission from the internal combustion engine. This arrangement effectively prevents deterioration of the catalyst used in the catalytic conversion unit.

BEST MODES OF CARRYING OUT THE INVENTION

Figure 1:
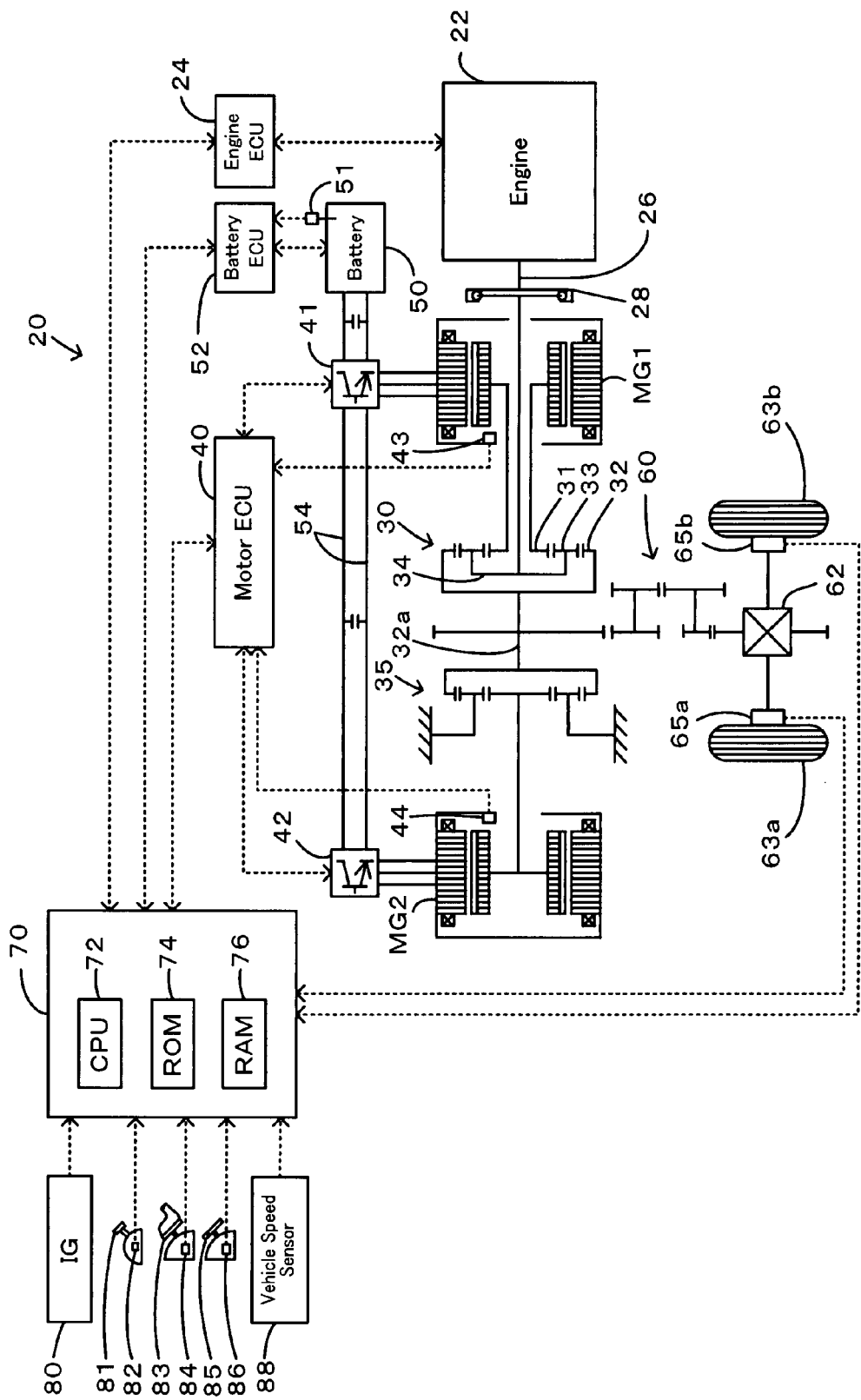
FIG. 1 schematically illustrates the configuration of a hybrid vehicle equipped with a power output apparatus in one embodiment of the invention.

One mode of carrying out the invention is described below as a preferred embodiment with reference to the accompanied drawings. FIG. 1 schematically illustrates the configuration of a hybrid vehicle 20 equipped with a power output apparatus in one embodiment of the invention. As illustrated, the hybrid vehicle 20 of the embodiment has an engine 22 and a planetary gear 30. The planetary gear 30 includes a carrier 34 that supports multiple pinion gears 33 in a rotatable manner and is connected via a damper 28 to a crankshaft 26 or an output shaft of the engine 22. The hybrid vehicle 20 further includes a motor MG1 that is connected to a sun gear 31 of the planetary gear 30 and has power generation capability, a motor MG2 that is linked via a reduction gear 35 to a ring gear shaft 32a or a driveshaft connecting with a ring gear 32 of the planetary gear 30, and a hybrid electronic control unit 70 that controls the operations of the whole hybrid vehicle 20. The ring gear shaft 32a or the driveshaft is linked to drive wheels 63a and 63b via a gear mechanism 60 and a differential gear 62. The power output to the ring gear shaft 32a can thus be used as driving power of the hybrid vehicle 20.

Figure 2:
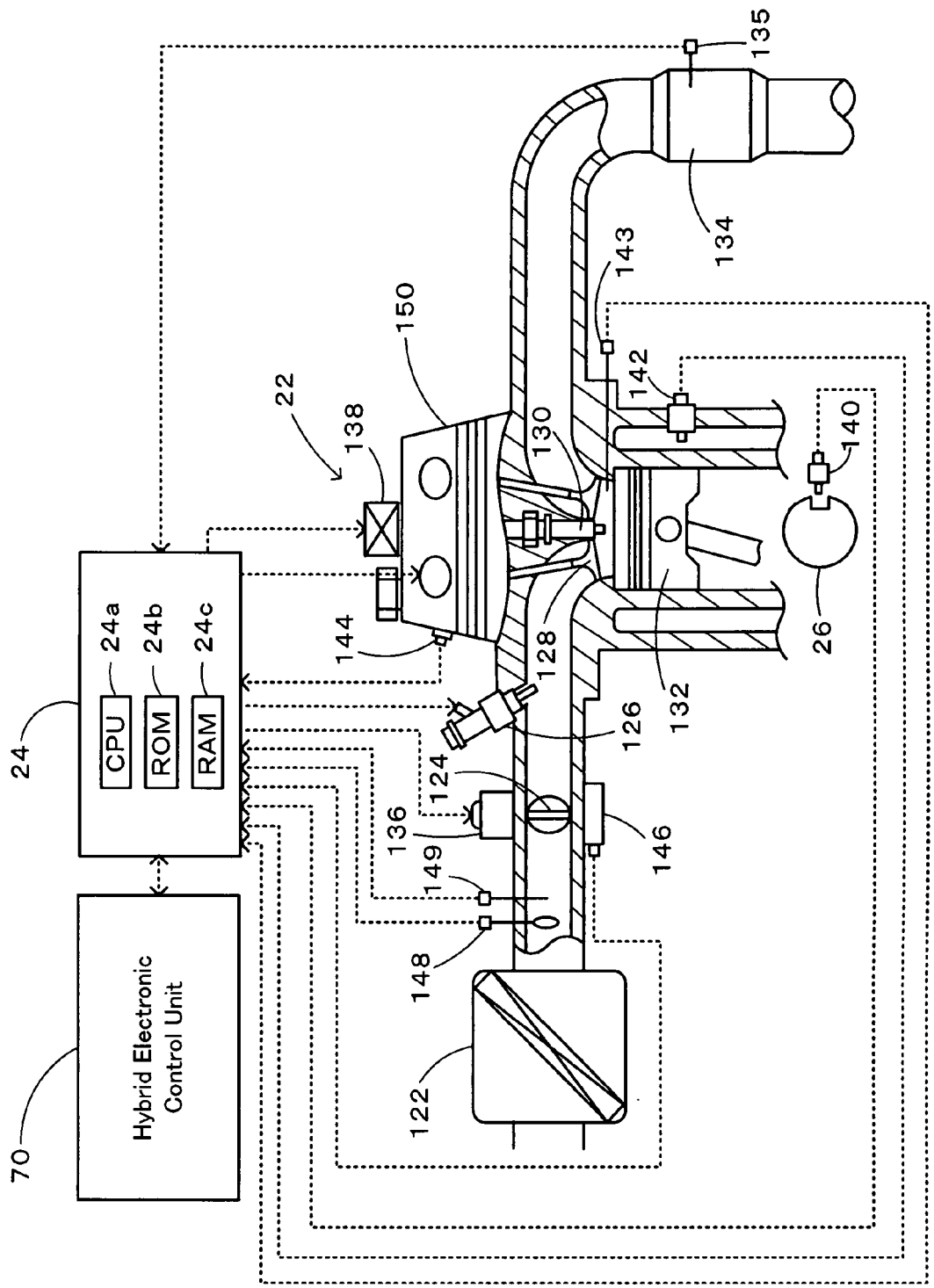
FIG. 2 schematically shows the structure of an engine included in the hybrid vehicle of, the embodiment.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, signals from various sensors that measure and detect, the conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a catalyst bed temperature from a temperature sensor 135 mounted on the catalytic conversion unit 134, an in-cylinder pressure from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal from an air flow meter 148 attached to an air intake conduit, and an intake air temperature from a temperature sensor 149 attached to the air intake conduit. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The planetary gear 30 works as a power distribution integration mechanism and includes the sun gear 31 as an external gear, the ring gear 32 as an internal gear arranged concentrically with the sun gear 31, the multiple pinion gears 33 engaging with the sun gear 31 and with the ring gear 32, and the carrier 34 holding the multiple pinion gears 33 to allow both their revolutions and their rotations on their axes. The planetary gear 30 accordingly has the sun gear 31, the ring gear 32, and the carrier 34 as rotational elements of differential motions. The carrier 34, the sun gear 31, and the ring gear 32 of the planetary gear 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed into the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted through the ring gear shaft 32a and is eventually output to the drive wheels 63a, 63b of the hybrid vehicle 20 via the gear mechanism 60 and the differential gear 62.

The motors MG1 and MG2 are constructed as known synchronous motor generators that may be actuated both as a generator and as a motor. The motors MG1 and MG2 transmit electric powers to and from a battery 50 (accumulator unit) via inverters 41 and 42. Both the motors MG1 and MG2 are under operation control of a motor electronic control unit 40 (hereafter referred to as motor ECU 40). The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from electric current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

The battery 50 is under control and management of a battery electronic control unit 52 (hereafter referred to as battery ECU 52). The battery ECU 52 inputs signals required for management and control of the battery 50, for example, an inter-terminal voltage from a voltage sensor (not shown) located between terminals of the battery 50, a charge-discharge current from an electric current sensor (not shown) located in a power line 54 connecting with an output terminal of the battery 50, and a battery temperature Tb from a temperature sensor 51 attached to the battery 50. The battery ECU 52 computes a remaining charge level or current state of charge (SOC) of the battery 50 for management and control of the battery 50. The battery ECU 52 also sets input and output limits Win and Wout of the battery 50 and a charge-discharge power demand Pb* as a required electric power level for charging or discharging the battery 50, based on the computed state of charge SOC and the measured battery temperature Tb of the battery 50. Such data are transmitted from the battery ECU 52 to the hybrid electronic control unit 70 by communication according to the requirements.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, and wheel speeds Vwa through Vwd from wheel speed sensors 65a through 65d attached to the drive wheels 63a and 63b and to driven wheels 63c and 63d (not shown). The hybrid electronic control unit 70 is connected with the engine ECU 24, the motor ECU 40, and the battery ECU 52 via the communication port to transmit diverse control signals and data to and from the engine ECU 24, the motor ECU 40, and the battery ECU 52.

The hybrid vehicle 20 of the embodiment constructed as described above sets a torque demand to be output to the ring gear shaft 32a or the drive shaft, based on the vehicle speed V and the accelerator opening Acc (corresponding to the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the planetary gear 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the planetary gear 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
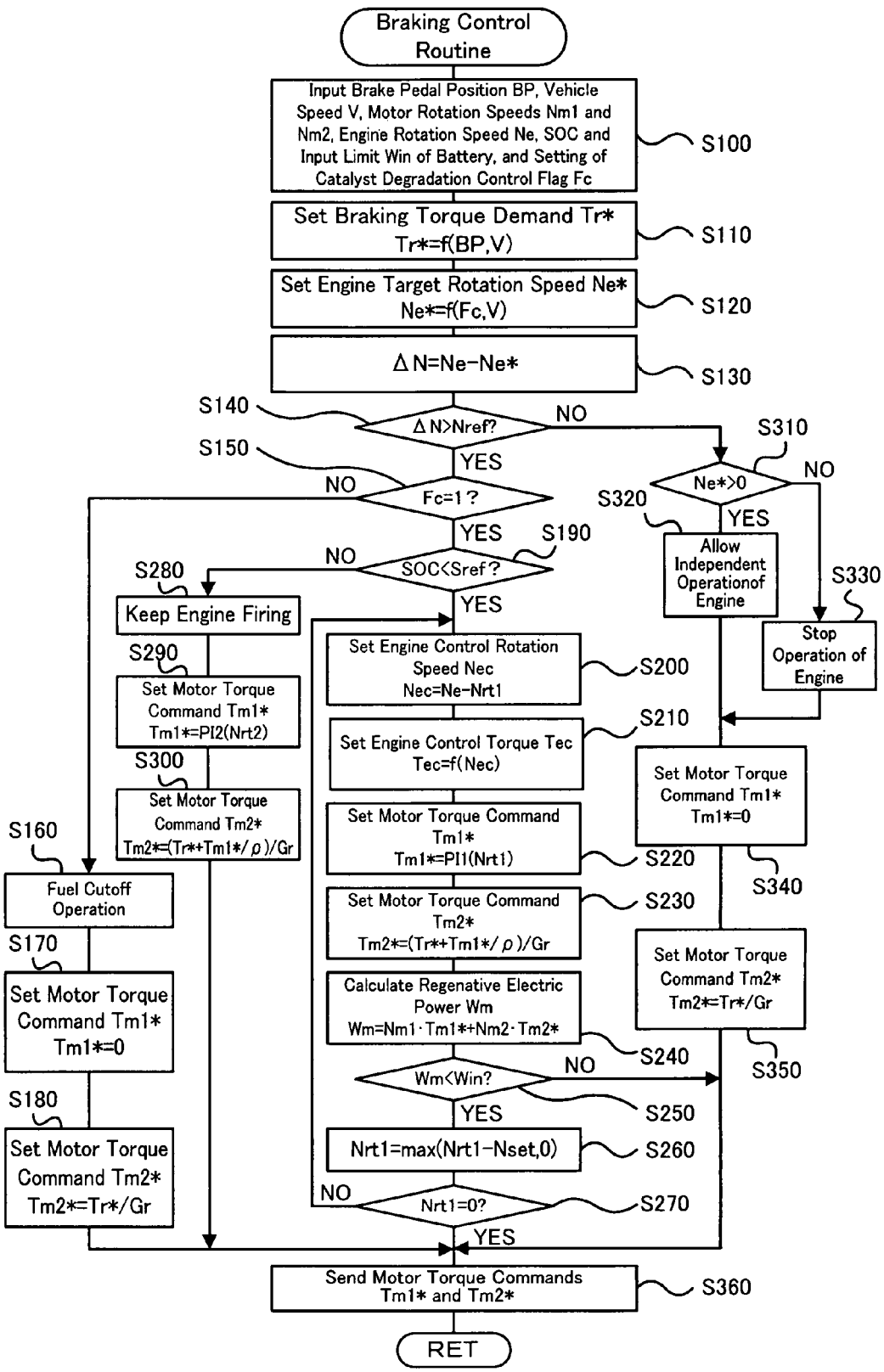
FIG. 3 is a flowchart showing a braking control routine executed by a hybrid electronic control unit mounted on the hybrid vehicle of the embodiment.

The description regards the operations of the hybrid vehicle 20 of the embodiment having the configuration discussed above, especially a series of operations in response to the driver's release of the accelerator pedal 83 or the driver's depression of the brake pedal 85 to set a light load or to apply a braking force under catalyst degradation control triggered by a temperature increase of the catalyst bed in the catalytic conversion unit 134. The concrete procedure of catalyst degradation control in this embodiment prohibits the fuel cutoff to the engine 22 and accordingly prevents a mass supply of the air to the catalytic conversion unit 134 to further raise the temperature of the catalyst bed. This control procedure continues the fuel supply to the engine 22 for firing even in the case of no requirement of power output from the engine 22, for example, under braking of the hybrid vehicle 20 or in response to a low power demand of the hybrid vehicle 20. The engine ECU 24 executes a catalyst degradation control flag setting routine (not shown) and sets '1' to a catalyst degradation control flag Fc when the catalyst bed temperature measured by the temperature sensor 135 attached to the catalytic conversion unit 134 rises to or over a preset level. The hybrid electronic control unit 70 then executes the catalyst degradation control based on the setting of the catalyst degradation control flag Fc. FIG. 3 is a flowchart showing a braking control routine executed by the hybrid electronic control unit 70 as a drive control flow including the catalyst degradation control under braking of the hybrid vehicle 20. This braking control routine is repeatedly executed at preset time intervals, for example, at every several msec.

In the braking control routine, the CPU 72 of the hybrid electronic control unit 70 first inputs various data required for control, that is, the brake pedal position BP from the brake pedal position sensor 86, the vehicle speed V from the vehicle speed sensor 88, a rotation speed Ne of the engine 22, rotation speeds Nm1 and Nm2 of the motors MG1 and MG2, the catalyst degradation control flag Fc, the state of charge (SOC) and an input limit Win of the battery 50 (step S100). The rotation speed Ne of the engine 22 is computed on the basis of a signal from the crank position sensor 140 attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The catalyst degradation control flag Fc is set by and received from the engine ECU 24 by communication. The state of charge SOC of the battery 50 is computed by and received from the battery ECU 52 by communication. The input limit Win of the battery 50 is set based on the state of charge SOC of the battery 50 and is received from the battery ECU 52 by communication.

Figure 4:
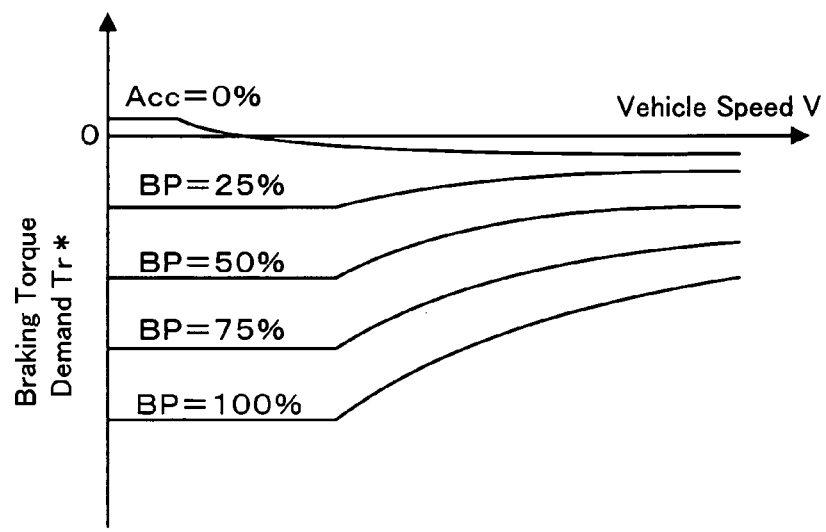
FIG. 4 shows one example of a braking torque demand setting map.

After the data input, the CPU 72 sets a braking torque demand Tr* to be output to the ring gear shaft 32a or the driveshaft linked with the drive wheels 63a and 63b as a braking torque required for the hybrid vehicle 20, based on the input brake pedal position BP and the input vehicle speed V (step S110) A concrete procedure of setting the braking torque demand Tr* in this embodiment stores in advance variations in braking torque demand Tr* against the brake pedal position BP and the vehicle speed V as a braking torque demand setting map in the ROM 74 and reads the braking torque demand Tr* corresponding to the given brake pedal position BP and the given vehicle speed V from this braking torque demand setting map. One example of the braking torque demand setting map is shown in FIG. 4.

The CPU 72 subsequently sets a target rotation speed Ne* of the engine, based on the setting of the catalyst degradation control flag Fc and the input vehicle speed V (step S120). Since this braking control is executed during braking of the hybrid vehicle 20, power output from the engine 22 is unnecessary at the current moment. The procedure of this embodiment sets the target rotation speed Ne* according to the vehicle speed V to ensure prompt power output from the engine 22 in response to the driver's subsequent depression of the accelerator pedal 83. For example, in the case of setting 0 to the catalyst degradation control flag Fc (that is, in the case of non-requirement of catalyst degradation control), when the current vehicle speed V is lower than a preset level, for example, 10 km/h or 20 km/h, the target rotation speed Ne* is set equal to 0 to stop the engine 22. When the current vehicle speed V is not lower than the preset level, the target rotation speed Ne* is set equal to a specified rotation speed, for example, 800 rpm or 1000 rpm. In the case of setting 1 to the catalyst degradation control flag Fc (that is, in the case of requirement of catalyst degradation control), on the other hand, unconditionally the target rotation speed Ne* is set equal to a specified rotation speed, for example, 800 rpm or 1000 rpm.

The CPU 72 calculates a rotation speed difference $\Delta N$ between the input rotation speed Ne and the set target rotation speed Ne* of the engine 22 (step S130) and compares the calculated rotation speed difference $\Delta N$ with a preset reference value Nref (step S140). The reference value Nref is set to an allowable deviation of rotation speed from the target rotation speed Ne*, which enables independent operation of the engine 22 at the target rotation speed Ne* without positive compensation of the rotation speed by the motor MG1. The reference value Nref is set to a relatively small value.

Figure 5:
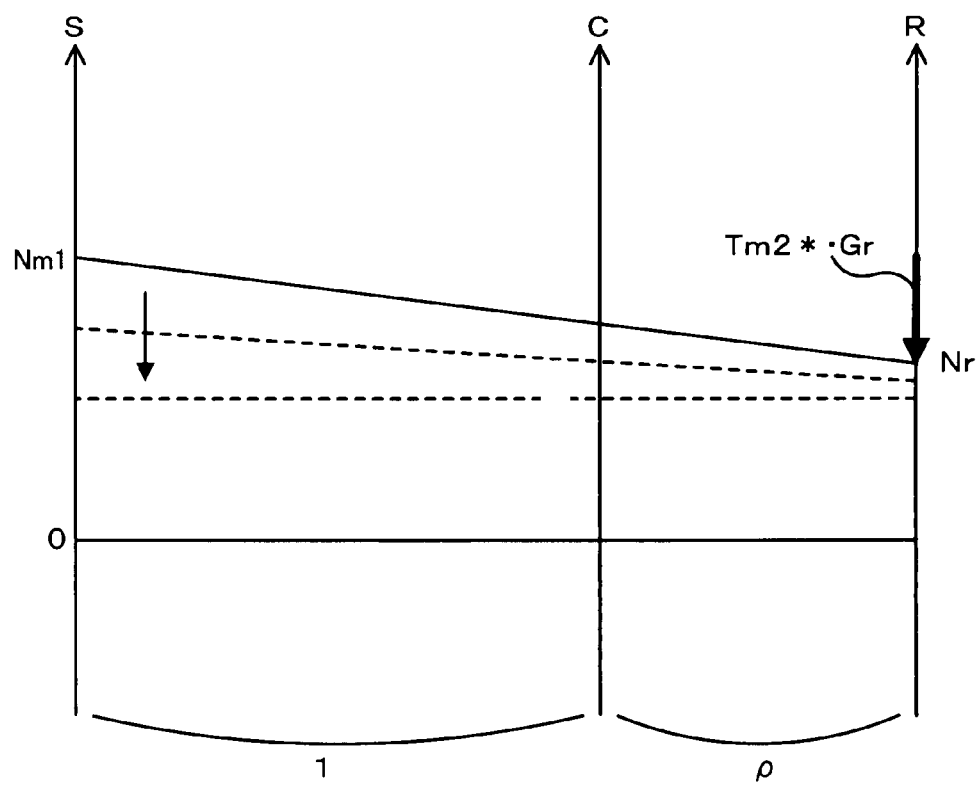
FIG. 5 is an alignment chart showing torque-rotation speed dynamics of respective rotational elements included in a planetary gear in a braking process with fuel cutoff to the engine.

On one hypothetical occasion, the driver steps down the accelerator pedal 83 to drive the engine 22 at a relatively high rotation speed and accordingly increase the vehicle speed V to a relatively high level. The driver then releases the accelerator pedal 83 and lightly steps on the brake pedal 85. On this occasion, a relatively low rotation speed is set to the target rotation speed Ne*, and the result of comparison at step S140 gives the greater rotation speed difference ΔN than the preset reference value Nref. Under this condition, the CPU 72 identifies whether the catalyst degradation control flag Fc is equal to 1 (step S150). When the catalyst degradation control flag Fc is equal to 0 at step S150, that is, in the case of non-requirement of catalyst degradation control, the CPU 72 performs the fuel cut-off operation to temporarily stop the fuel supply to the engine 22 (step S160), sets 0 to a torque command Tm1* of the motor MG1 (step S170), and divides the set braking torque demand Tr* by the gear ratio Gr of the reduction gear 35 to set a torque command Tm2* of the motor MG2 (step S180). The CPU 72 then sends the torque commands Tm1* and Tm2* of the motors MG1 and MG2 to the motor ECU 40 (step S360), and terminates the braking control routine of FIG. 3. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*. FIG. 5 is an alignment chart showing torque-rotation speed dynamics of the respective rotational elements included in the planetary gear 30 in the braking process with fuel cutoff to the engine 22. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32, which is obtained by dividing the rotation speed Nm2 of the motor MG2 by the gear ratio Gr of the reduction gear 35. A downward thick arrow on the axis 'R' represents a torque applied to the ring gear shaft 32a when the motor MG2 is driven with the torque command Tm2*. The solid line shows an alignment graph at the time of the driver's depression of the brake pedal 85, and the broken line shows a time change of the alignment graph. As clearly shown by the comparison between the solid line and the broken line, the fuel cutoff results in a decrease in rotation speed Ne of the engine 22.

When the catalyst degradation control flag Fc is equal to 1 at step S150, that is, in the case of requirement of catalyst degradation control, on the other hand, the state of charge SOC of the battery 50 is compared with a preset reference charge level Sref (step S190). The reference charge level Sref is a sufficiently marginal charge level to enable the battery 50 to be charged with the amount of electric power generated in the course of a change in rotation speed Ne of the engine 22 to the target rotation speed Ne* in the efficient operation state of the engine 22 while a braking force is applied to the vehicle running on the flat road at a relatively high speed to stop the vehicle.

Figure 6:
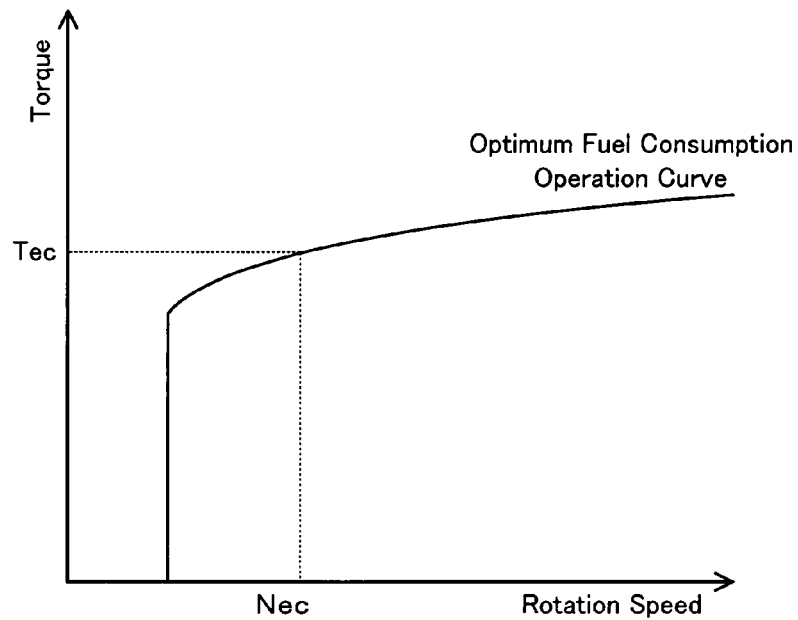
FIG. 6 shows one example of a control torque setting map.

When the state of charge SOC of the battery 50 is lower than the preset reference charge level Sref at step S190, it is determined that the battery 50 has a sufficient margin for charging. The CPU 72 accordingly subtracts a rotation speed variation Nrt1 from the rotation speed Ne of the engine 22 to set a control rotation speed Nec of the engine 22 (step S200), and subsequently sets a control torque Tec to assure efficient operation of the engine 22 at the control rotation speed Nec (step S210). An initial value of the rotation speed variation Nrt1 is set in a specific range of rotation speed that ensures no occurrence of a misfire in the engine 22 even with the varying rotation speed Ne before a subsequent cycle of this braking control routine. The rotation speed variation Nrt1 is smaller than an allowable change in rotation speed Ne of the engine 22 with power output. The procedure of setting the control torque Tec in this embodiment specifies an optimum fuel consumption operation curve as a torque-rotation speed relation for efficient operation of the engine 22, stores the specified optimum fuel consumption operation curve as a control torque setting map in the ROM 74, and reads the control torque Tec corresponding to the given control rotation speed Nec from the control torque setting map. One example of the control torque setting map is shown in FIG. 6. The CPU 72 subsequently sets the torque command Tm1* of the motor MG1 according to Equation (1) given below to shift a drive point of the engine 22 on the optimum fuel consumption operation curve by the rotation speed variation Nrt1 (step S220), and sets the torque command Tm2* of the motor MG2 according to Equation (2) given below to ensure output of the braking torque demand Tr* to the ring gear shaft 32a (step S230):

$$Tm1^* = k1 \cdot Nrt1 + k2 \int Nrt1 \cdot dt \quad (1)$$

$$Tm2^* = (Tr^* + Tm1^*/\rho)/Gr \quad (2)$$

Figure 7:
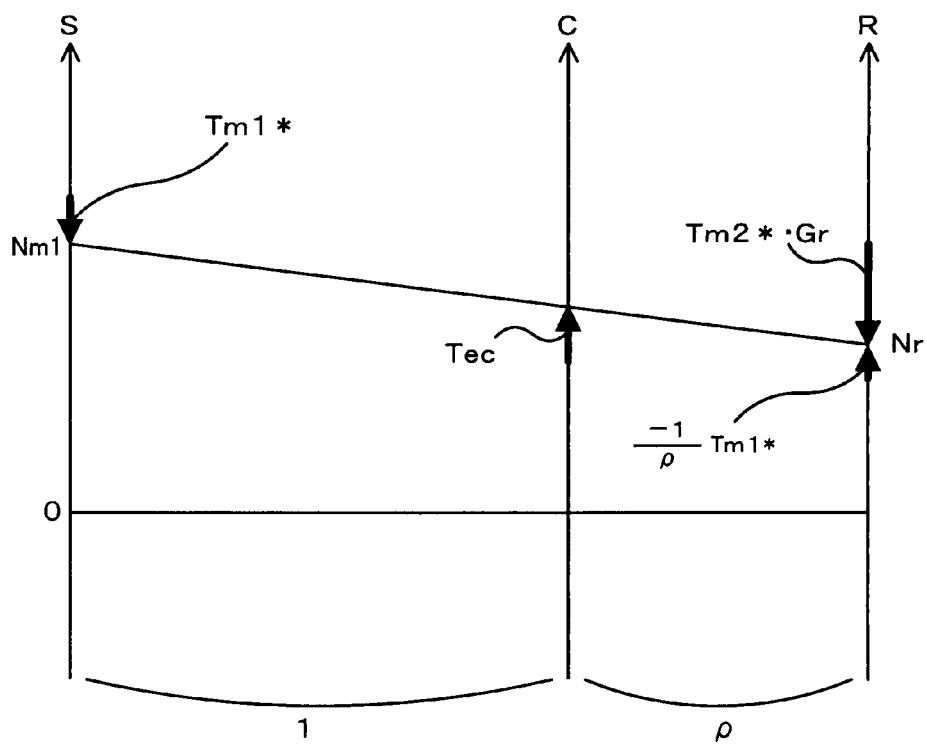
FIG. 7 is an alignment chart showing torque-rotation speed dynamics of the respective rotational elements included in the planetary gear in the course of a shift of a drive point of the engine on an optimum fuel consumption operation curve.

Equation (1) is a relational expression of feedback control, and 'k1' in the first term and 'k2' in the second term on the right side respectively denote a gain of the proportional and a gain of the integral term. Equation (2) is a dynamic relational expression of the rotational elements of the planetary gear 30 under the condition of application of the braking torque demand Tr* to the ring gear 32. FIG. 7 is an alignment chart showing torque-rotation speed dynamics of the respective rotational elements included in the planetary gear 30 in this state. Equation (2) is readily led from the alignment chart of FIG. 7.

An amount of electric power (regenerative electric power) Wm generated by the motors MG1 and MG2 is calculated by summation of the product of the torque command Tm1* and the current rotation speed Nm1 of the motor MG1 and the product of the torque command Tm2* and the current rotation speed Nm2 of the motor MG2 (step S240). The calculated regenerative electric power Wm is compared with the input limit Win of the battery 50 (step S250). When the regenerative electric power Wm is less than the input limit Win of the battery 50 at step S250, the rotation speed variation Nrt1 is decreased by a preset small value Nset to be updated (step S260). The decrease of the rotation speed variation Nrt1 is restricted to 0 as a lower limit. The CPU 72 then determines whether the updated rotation speed variation Nrt1 is equal to 0 (step S270). When the updated rotation speed variation Nrt1 is not equal to 0 at step S270, the braking control routine goes back to step S200 and repeats the processing of and after step S200 to set the control rotation speed Nec and the control torque Tec of the engine 22 and the torque commands Tm1* and Tm2* of the motors MG1 and MG2 with the updated rotation speed variation Nrt1, calculate the regenerative electric power Wm, and compare the calculated regenerative electric power Wm with the input limit Win of the battery 50. When the regenerative electric power Wm is not less than the input limit Win of the battery 50 at step S250 or when the rotation speed variation Nrt1 is equal to 0 at step S270, the CPU 72 sends the torque commands Tm1* and Tm2* of the motors MG1 and MG2 to the motor ECU 40 (step S360) and exits from this braking control routine of FIG. 3. This control flow shifts the drive point of the engine 22 on the optimum fuel consumption operation curve within the input limit Win of the battery 50 to change the rotation speed Ne of the engine 22 to the target rotation speed Ne*.

When the state of charge SOC of the battery 50 is not lower than the preset reference charge level Sref at step S190, it is determined that the battery 50 does not have a sufficient margin for charging. The CPU 72 accordingly gives an engine operation command to drive the engine 22 with a less quantity of fuel injection for output of a small torque (step S280). The CPU 72 then calculates a torque demand required for changing the rotation speed Ne of the engine 22 by a preset rotation speed variation Nrt2 with output of the small torque according to Equation (3) given below and sets the calculated torque demand to the torque command Tm1* of the motor MG1 (step S290):

$$Tm1^* = k3 \cdot Nrt2 + k4 \int Nrt2 \cdot dt \tag{3}$$

The CPU 72 subsequently sets the torque command Tm2* of the motor MG2 according to Equation (2) given above (step S300), sends the torque commands Tm1* and Tm2* of the motors MG1 and MG2 to the motor ECU 40 (step S360), and exits from the braking control routine of FIG. 3. The rotation speed variation Nrt2 is set in a specific range of rotation speed that ensures no occurrence of a misfire in the engine 22 even with the varying rotation speed Ne before a subsequent cycle of this braking control routine. The rotation speed variation Nrt2 is smaller than an allowable change in rotation speed Ne of the engine 22 with output of a small torque. Equation (3) is a relational expression of feedback control, and 'k3' in the first term and 'k4' in the second term on the right side respectively denote a gain of the proportional and a gain of the integral term. Since Equation (3) is the relational expression of feedback control to change the rotation speed of the engine 22 with output of a small torque, the proportional gain 'k3' is smaller than the proportional gain 'k1' in Equation (1) as the relational expression of feedback control for a shift of the drive point of the engine 22 on the optimum fuel consumption operation curve. Even when the state of charge SOC of the battery 50 has only an insufficient margin for charging, such control effectively changes the rotation speed Ne of the engine 22 to the target rotation speed Ne* with keeping the explosive combustion of the fuel in the engine 22.

When the calculated rotation speed difference ΔN is not greater than the preset reference value Nref at step S140, regardless of execution or non-execution of the catalyst degradation control, the CPU 72 determines whether the target rotation speed Ne* of the engine 22 is higher than 0 (step S310). When the target rotation speed Ne* is higher than 0 at step S310, the CPU 72 gives an engine operation command to the engine ECU 24 to allow independent operation of the engine 22 at the target rotation speed Ne* without output of a torque (step S320). When the target rotation speed Ne* is equal to 0 at step S310, on the other hand, the CPU 72 gives an engine stop command to the engine ECU 24 to stop the operation of the engine 22 (step S330). After the processing of either step S320 or step S330, the CPU 72 sets 0 to the torque command Tm1* of the motor MG1 (step S340) divides the set braking torque demand Tr* by the gear ratio Gr of the reduction gear 35 to set the torque command Tm2* of the motor MG2 (step S350), and sends the torque commands Tm1* and Tm2* of the motors MG1 and MG2 to the motor ECU 40 (step S360). The braking control routine of FIG. 3 is then terminated.

In the case of requirement of catalyst degradation control with the setting of the catalyst degradation control flag Fc to 1, the hybrid vehicle 20 of the embodiment controls the engine 22 and the two motors MG1 and MG2 to ensure output of the braking torque demand Tr* to the ring gear shaft 32a with a shift of the drive point of the engine 22 on the optimum fuel consumption operation curve by the rotation speed variation Nrt1, which is to be kept in the specific range of rotation speed that ensures no occurrence of a misfire in the engine 22. This arrangement enables a stable change of the rotation speed Ne of the engine 22 to the target rotation speed Ne* and desirably enhances the fuel consumption under the catalyst degradation control, compared with the conventional control of simply keeping the engine firing condition. The adjustment of the rotation speed variation Nrt1 within the input limit Win of the battery 50 desirably prevents the battery 50 from being charged with excessive electric power.

In the hybrid vehicle 20 of the embodiment, the braking control calculates the regenerative electric power Wm by summation of the product of the torque command Tm1* and the current rotation speed Nm1 of the motor MG1 and the product of the torque command Tm2* and the current rotation speed Nm2 of the motor MG2. One modified flow of the braking control may calculate the regenerative electric power Wm based on the time change in moment of inertia in the rotation system including the engine 22 and the motor MG1 and the power consumption of the motor MG2. This latter calculation preferably takes into account an electric loss and a mechanical loss.

In the hybrid vehicle 20 of the embodiment, the braking control shifts the drive point of the engine 22 on the optimum fuel consumption operation curve by the rotation speed variation Nrt1, which is to be kept in the specific range of rotation speed that ensures no occurrence of a misfire in the engine 22. One modified flow of the braking control may shift the drive point of the engine 22 by the rotation speed variation Nrt1 on a different operation curve from the optimum fuel consumption operation curve, as long as the rotation speed variation Nrt1 is kept in the specific range of rotation speed that ensures no occurrence of a misfire in the engine 22.

The rotation speed variation Nrt1 used in the hybrid vehicle 20 of the embodiment is set in the specific range of rotation speed that ensures no occurrence of a misfire in the engine 22 even with the varying rotation speed Ne and is smaller than the allowable change in rotation speed Ne of the engine 22 with power output. The rotation speed variation Nrt1 may, however, be equal to or greater than the allowable change in rotation speed Ne of the engine 22 with power output, as long as the change in rotation speed Ne of the engine 22 is kept in the specific range of rotation speed that ensures no occurrence of a misfire in the engine 22.

The hybrid vehicle 20 of the embodiment uses the preset rotation speed variations Nrt1 and Nrt2 to change the rotation speed Ne of the engine 22. Such a regular change of the rotation speed Ne of the engine 22 is, however, not essential, and the rotation speed Ne of the engine 22 may be changed in an irregular manner.

The hybrid vehicle 20 of the embodiment executes the catalyst degradation control by taking into account the state of charge SOC and the input limit Win of the battery 50. When the battery 50 has a sufficiently large capacity, the catalyst degradation control may be executed without considering the state of charge SOC and the input limit Win of the battery 50.

Figure 8:
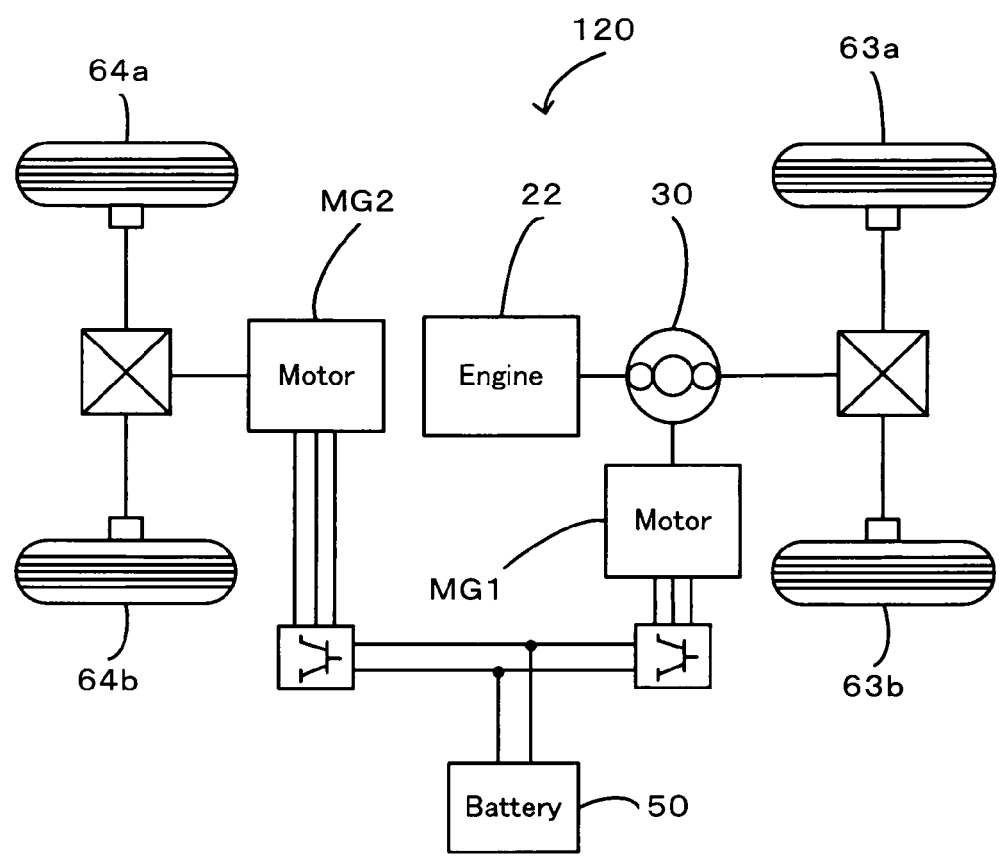
FIG. 8 schematically illustrates the configuration of another hybrid vehicle as one modified example.

In the hybrid vehicle 20 of the embodiment described above, the power of the motor MG2 goes through gear change by the reduction gear 35 and is output to the ring gear shaft 32a. The technique of the invention is, however, not restricted to this configuration but may be adopted in another hybrid vehicle 120 of a modified configuration shown in FIG. 8. In the hybrid vehicle 120 of FIG. 8, the output power of the motor MG2 is connected to a different axle (an axle linked to wheels 64*a* and 64*b*) from an axle connecting with the ring gear shaft 32*a* (an axle linked to the drive wheels 63*a* and 63*b*).

Figure 9:
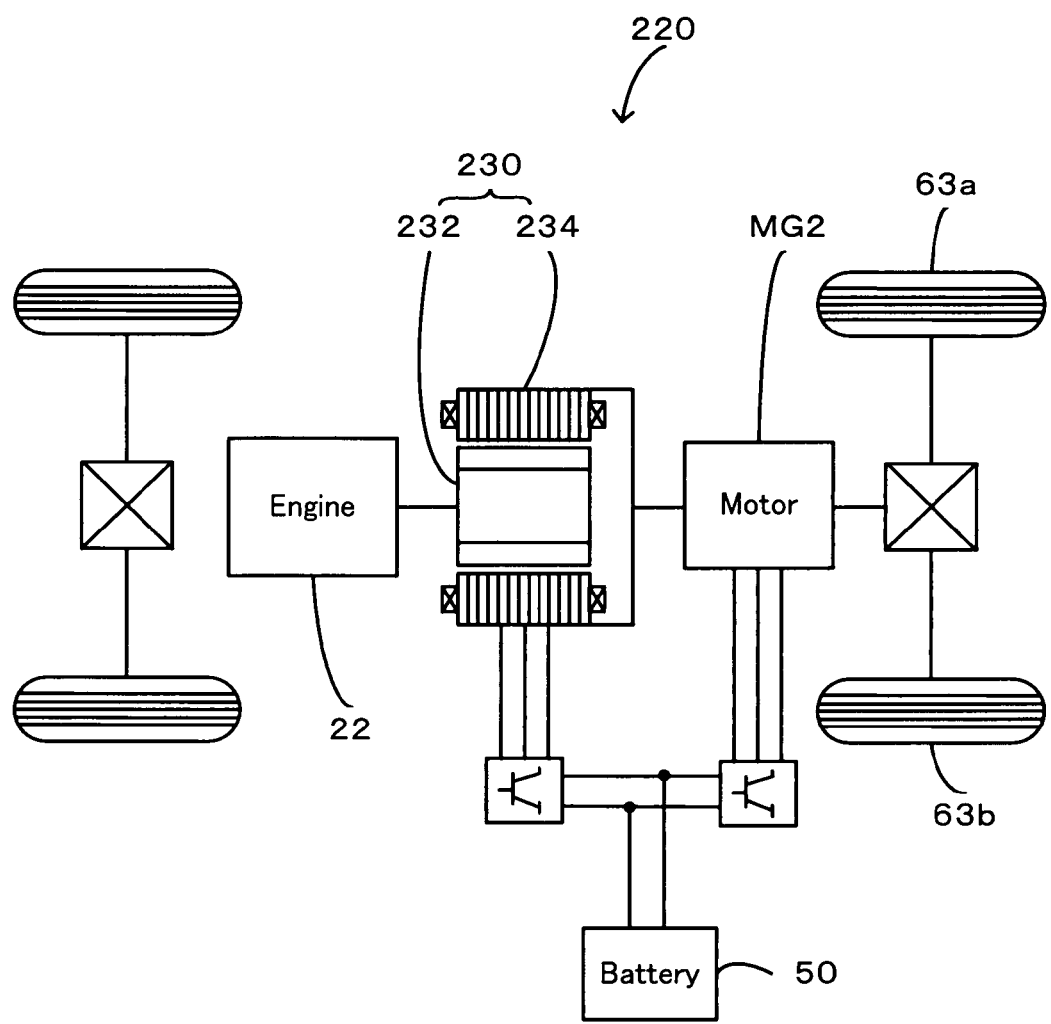
FIG. 9 schematically illustrates the configuration of still another hybrid vehicle as another modified example.

In the hybrid vehicle 20 of the embodiment, the power of the engine 22 is transmitted through the planetary gear 30 and is output to the ring gear shaft 32*a* or the driveshaft linked with the drive wheels 63*a* and 63*b*. The principle of the invention is also applicable to a hybrid vehicle 220 of another modified configuration shown in FIG. 9, which is equipped with a pair-rotor motor 230. The pair-rotor motor 230 includes an inner rotor 232 connected to the crankshaft 26 of the engine 22 and an outer rotor 234 connected to a driveshaft for power output to the drive wheels 63*a* and 63*b*. The pair-rotor motor 230 transmits part of the output power of the engine 22 to the driveshaft, while converting the residual engine output power into electric power.

The above embodiment regards the hybrid vehicle 20 equipped with the power output apparatus of the invention. The power output apparatus of the invention having the functions of catalyst degradation control is, however, not restricted to the hybrid vehicle but may be mounted on any of other various vehicles and diverse moving bodies including boats and ships and aircraft or may be incorporated in stationary equipment like construction machines. The technique of the invention may also be actualized as a control method of such a power output apparatus.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to the manufacturing industries of power output apparatuses and automobiles and other relevant industries.

The invention claimed is:

1. A power output apparatus that outputs power to a driveshaft, the power output apparatus comprising:
   an internal combustion engine that has an output shaft and outputs power, the internal combustion engine being equipped with a catalytic conversion unit that uses a catalyst for catalytic conversion of an exhaust gas or emission from the internal combustion engine;
   an electric power-mechanical power input output mechanism that receives as input, and also outputs, electric power and mechanical power, the electric power-mechanical power input output mechanism is connected with the output shaft of the internal combustion engine and with the driveshaft and outputs at least part of the output power of the internal combustion engine to the driveshaft;
   a motor that inputs and outputs power from and to the driveshaft;
   an accumulator unit that transmits electric power to and from both the electric power-mechanical power input output mechanism and the motor;
   a driving force demand setting unit that sets a driving force demand to be output to the driveshaft;
   a target operation state setting module that enables intermittent operation of the internal combustion engine when it is determined that the internal combustion engine does not need to continuously operate and sets a target operation state of the internal combustion engine based on the set driving force demand, and continuously keeps operation of the internal combustion engine when it is determined that the internal combustion engine needs to continuously operate and sets the target operation state of the internal combustion engine based on the set driving force demand; and
   a control module in operative communication with an accelerator movable between a depressed position and a released position, the control module, when required to output either a braking force or a light load to the drive shaft while the accelerator is in the released position, effects control such that:
      regardless of whether it is determined that the internal combustion engine needs to continuously operate or does not need to continuously operate, the control module controls the internal combustion engine to continuously operate to effect catalyst degradation control to reduce degradation of the catalyst used by the catalytic conversion unit;
      in a circumstance where it is determined that the internal combustion engine does not need to continuously operate, the control module controls the internal combustion engine, the electric power-mechanical power input output mechanism, and the motor to drive the internal combustion engine in the set target operation state to ensure output of a driving force equivalent to the set driving force demand to the driveshaft; and
      in a circumstance where it is determined that the internal combustion engine needs to continuously operate, the control module controls the internal combustion engine, the electric power-mechanical power input output mechanism, and the motor to make an operating status of the internal combustion engine approach the set target operation state while continuing the explosive combustion of the fuel in the internal combustion engine with satisfaction of a predetermined routine for efficient operation of the internal combustion engine and lowering of rotation speed of the internal combustion engine to ensure output of the driving force equivalent to the set driving force demand to the driveshaft.

2. A power output apparatus in accordance with claim 1, wherein the predetermined routine includes a constraint for efficient operation of the internal combustion engine.

3. A power output apparatus in accordance with claim 1, the power output apparatus further comprising:
   a chargeable range detection unit that detects a chargeable range of the accumulator unit,
   wherein the control module controls the internal combustion engine, the electric power-mechanical power input output mechanism, and the motor to make the operating status of the internal combustion engine approach the set target operation state via the predetermined routine while continuing the explosive combustion of the fuel in the internal combustion engine based on the detected chargeable range of the accumulator unit.

4. A power output apparatus in accordance with claim 1, wherein the control module controls the internal combustion engine, the electric power-mechanical power input output mechanism, and the motor to change a rotation speed of the internal combustion engine by a specified rotation number per unit time and thereby make the operating status of the internal combustion engine approach the set target operation state.

5. A power output apparatus in accordance with claim 4, wherein the specified rotation number per unit time is smaller than a rotation number per unit time under control in a state other than the specific driving state to make the operating status of the internal combustion engine approach the set target operation state.

6. A power output apparatus in accordance with claim 1, wherein the electric power-mechanical power input output mechanism comprises:
a three shaft-type power input output structure that is connected to three shafts, the three shafts being (1) the output shaft of the internal combustion engine, (2) the driveshaft, and (3) a rotating shaft, and inputs and outputs power from and to a residual shaft based on powers input and output from and to any two shafts among the three shafts; and
a generator that inputs and outputs power from and to the rotating shaft.

7. A vehicle, comprising:
an internal combustion engine that has an output shaft and outputs power, the internal combustion engine being equipped with a catalytic conversion unit that uses a catalyst for catalytic conversion of an exhaust gas or emission from the internal combustion engine;
an electric power-mechanical power input output mechanism that receives as input, and also outputs, electric power and mechanical power, the electric power-mechanical power input output mechanism is connected with the output shaft of the internal combustion engine and with a first axle and outputs at least part of the output power of the internal combustion engine to a driveshaft;
a motor that inputs and outputs power from and to the first axle or a second axle different from the first axle;
an accumulator unit that transmits electric power to and from both the electric power-mechanical power input output mechanism and the motor;
a driving force demand setting unit that sets a driving force demand required for a drive of the vehicle;
a target operation state setting module that enables intermittent operation of the internal combustion engine when it is determined that the internal combustion engine does not need to continuously operate and sets a target operation state of the internal combustion engine based on the set driving force demand, and continuously keeps operation of the internal combustion engine when it is determined that the internal combustion engine needs to continuously operate and sets the target operation state of the internal combustion engine based on the set driving force demand;
an accelerator movable between a depressed position and a released position; and
a control module in operative communication with the accelerator and that, when required to output either a braking force or a light load to the drive shaft while the accelerator is in the released position, effects control such that:
regardless of whether it is determined that the internal combustion engine needs to continuously operate or does not need to continuously operate, the control module controls the internal combustion engine to continuously operate to effect catalyst degradation control to reduce degradation of the catalyst used by the catalytic conversion unit;
in a circumstance where it is determined that the internal combustion engine does not need to continuously operate, the control module controls the internal combustion engine, the electric power-mechanical power input output mechanism, and the motor to drive the internal combustion engine in the set target operation state to ensure output of a driving force equivalent to the set driving force demand to the vehicle: and
in a circumstance where it is determined that the internal combustion engine needs to continuously operate, the control module controls the internal combustion engine, the electric power-mechanical power input output mechanism, and the motor to make an operating status of the internal combustion engine approach the set target operation state while continuing the explosive combustion of the fuel in the internal combustion engine with satisfaction of a predetermined routine for efficient operation of the internal combustion engine and lowering of rotation speed of the internal combustion engine to ensure output of the driving force equivalent to the set driving force demand to the vehicle.

8. A vehicle in accordance with claim 7, wherein the predetermined routine includes a constraint for efficient operation of the internal combustion engine.

9. A vehicle in accordance with claim 7, the vehicle further comprising:
a chargeable range detection unit that detects a chargeable range of the accumulator unit,
wherein the control module controls the internal combustion engine, the electric power-mechanical power input output mechanism, and the motor to make the operating status of the internal combustion engine approach the set target operation state via the predetermined routine while continuing the explosive combustion of the fuel in the internal combustion engine based on the detected chargeable range of the accumulator unit.

10. A vehicle in accordance with claim 7, wherein the control module controls the internal combustion engine, the electric power-mechanical power input output mechanism, and the motor to change a rotation speed of the internal combustion engine by a specified rotation number per unit time and thereby make the operating status of the internal combustion engine approach the set target operation state.

11. A vehicle in accordance with claim 10, wherein the specified rotation number per unit time is smaller than a rotation number per unit time under control in a state other than the specific driving state to make the operating status of the internal combustion engine approach the set target operation state.

12. A vehicle in accordance with claim 7, wherein the electric power-mechanical power input output mechanism comprises:
a three shaft-type power input output structure that is connected to three shafts, the three shafts being (1) the output shaft of the internal combustion engine, (2) the driveshaft, and (3) a rotating shaft, and inputs and outputs power from and to a residual shaft based on powers input and output from and to any two shafts among the three shafts; and
a generator that inputs and outputs power from and to the rotating shaft.

13. A control method of a power output apparatus, the power output apparatus comprising: an internal combustion engine that has an output shaft and outputs power, the internal combustion engine being equipped with a catalytic conversion unit that uses a catalyst for catalytic conversion of an exhaust gas or emission from the internal combustion engine; an electric power-mechanical power input output mechanism that receives as input, and also outputs, electric power and mechanical power, the electric power-mechanical power input output mechanism is connected with the output shaft of the internal combustion engine and with a driveshaft and outputs at least part of the output power of the internal combustion engine to the driveshaft; a motor that inputs and outputs power from and to the driveshaft; an accumulator unit that transmits electric power to and from both the electric power-mechanical power input output mechanism and the motor; the control method of the power output apparatus comprising the steps of:

(a) enabling intermittent operation of the internal combustion engine when it is determined that the internal combustion engine does not need to continuously operate and setting a target operation state of the internal combustion engine based on the driving force demand to be output to the driveshaft, and continuously keeping operation of the internal combustion engine when it is determined that the internal combustion engine needs to continuously operate and setting the target operation state of the internal combustion engine based on the driving force demand;

(b) when required to output either a braking force or a light load to the drive shaft while an accelerator is in a released position, and it is determined that the internal combustion engine does not need to continuously operate, controlling the internal combustion engine, the electric power-mechanical power input output mechanism, and the motor to drive the internal combustion engine in the set target operation state to ensure output of a driving force equivalent to driving force demand to the driveshaft, (c) when required to output either a braking force or a light load to the drive shaft while an accelerator is in the released position, and it is determined that the internal combustion engine needs to continuously operate, controlling the internal combustion engine, the electric power-mechanical power input output mechanism, and the motor to make an operating status of the internal combustion engine approach the set target operation state while continuing the explosive combustion of the fuel in the internal combustion engine with satisfaction of a predetermined routine for efficient operation of the internal combustion engine and lowering of rotation speed of the internal combustion engine to ensure output of the driving force equivalent to the driving force demand to the driveshaft; and (d) executing catalyst degradation control, by controlling the combustion in the internal combustion engine while the accelerator is in the released position, regardless of whether it is determined that the internal combustion engine needs to continuously operate or does not need to continuously operate, to reduce degradation of the catalyst used by the catalytic conversion unit, and by inhibiting stopping of combustion in the internal combustion engine to reduce the degradation of the catalyst.

14. A control method of the power output apparatus in accordance with claim 13, wherein in step (c) the predetermined routine includes a constraint for efficient operation of the internal combustion engine.

15. A control method of the power output apparatus in accordance with claim 13, wherein the step (c) is a step for controlling the internal combustion engine, the electric power-mechanical power input output mechanism, and the motor to make the operating status of the internal combustion engine approach the set target operation state via the predetermined routine while continuing the explosive combustion of the fuel in the internal combustion engine based on the detected chargeable range of the accumulator unit.

16. A control method of the power output apparatus in accordance with claim 13, wherein the steps (b) and (c) are steps for controlling the internal combustion engine, the electric power-mechanical power input output mechanism, and the motor to change a rotation speed of the internal combustion engine by a specified rotation number per unit time and thereby make the operating status of the internal combustion engine approach the set target operation state.

17. A control method of the power output apparatus in accordance with claim 16, wherein the specified rotation number per unit time is smaller than a rotation number per unit time under control in the state other than the specific driving state to make the operating status of the internal combustion engine approach the set target operation state.

* * * * *